(12) United States Patent
Zeng et al.

(10) Patent No.: US 11,780,645 B2
(45) Date of Patent: Oct. 10, 2023

(54) BATTERY BOX

(71) Applicant: CONTEMPORARY AMPEREX TECHNOLOGY CO., LIMITED, Ningde (CN)

(72) Inventors: Yuqun Zeng, Ningde (CN); Fenggang Zhao, Ningde (CN); Xingdi Chen, Ningde (CN); Lei Wang, Ningde (CN); Linggang Zhou, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 873 days.

(21) Appl. No.: 16/663,058

(22) Filed: Oct. 24, 2019

(65) Prior Publication Data
US 2020/0144566 A1    May 7, 2020

(30) Foreign Application Priority Data
Nov. 1, 2018   (CN) .......................... 201811294488.8

(51) Int. Cl.
*B65D 21/02*     (2006.01)
*H01M 50/249*    (2021.01)
(Continued)

(52) U.S. Cl.
CPC ...... *B65D 21/0217* (2013.01); *H01M 50/202* (2021.01); *H01M 50/242* (2021.01);
(Continued)

(58) Field of Classification Search
CPC .. H01M 50/20; H01M 50/517; H01M 50/202; H01M 50/258; H01M 50/249; H01M 2220/20
See application file for complete search history.

(56) References Cited

U.S. PATENT DOCUMENTS 1,359,446 A * 11/1920 Stephens ................. B60R 16/04
                                                        224/558
4,664,281 A *  5/1987 Falk ....................... H02G 3/088
                                                        174/547
(Continued)

FOREIGN PATENT DOCUMENTS

CN         101395022 A     3/2009
CN         101997094 A     3/2011
(Continued)

OTHER PUBLICATIONS

Contemporary Amperex Technology Co., Limited, Extended European Search Report, EP19205017.7, dated Mar. 24, 2020, 8 pgs.
(Continued)

*Primary Examiner* — Anthony D Stashick
*Assistant Examiner* — Blaine G Neway
(74) *Attorney, Agent, or Firm* — ANOVA LAW GROUP, PLLC

(57) ABSTRACT

The present disclosure provides a battery box and a vehicle, the battery box comprises an upper box body, a lower box body, a connecting member, a fixing member. The upper box body comprises a first eave portion, the lower box body comprises a second eave portion. The first eave portion is provided with a first connecting hole, the second eave portion is provided with a second connecting hole and a mounting hole. The connecting member passes through the first connecting hole and the second connecting hole to connect the upper box body and the lower box body. The fixing member passes through the mounting hole to make the lower box body mounted to external equipment, compared with the conventional battery box, the lower box body is equivalent to the arrangement of eliminating the third eave portion, it simplifies the structure and reduces the weight, thereby improving the energy density.

19 Claims, 6 Drawing Sheets

(51) Int. Cl.
*H01M 50/242* (2021.01)
*H01M 50/202* (2021.01)
*B60L 50/60* (2019.01)
*B60L 50/64* (2019.01)
*B60K 1/04* (2019.01)

(52) U.S. Cl.
CPC ............. *H01M 50/249* (2021.01); *B60K 1/04* (2013.01); *B60L 50/64* (2019.02); *B60L 50/66* (2019.02); *H01M 2220/20* (2013.01); *Y02E 60/10* (2013.01); *Y02T 10/70* (2013.01)

(56) References Cited

U.S. PATENT DOCUMENTS

| | | | | |
|---|---|---|---|---|
| 11,139,527 | B2* | 10/2021 | Zeng | H01M 50/242 |
| 2003/0064281 | A1* | 4/2003 | Andersen | H01M 16/00 |
| | | | | 429/123 |
| 2009/0145676 | A1* | 6/2009 | Takasaki | H01M 50/249 |
| | | | | 180/68.5 |
| 2009/0226806 | A1 | 9/2009 | Kiya | |
| 2012/0321934 | A1 | 12/2012 | Hopkins et al. | |
| 2013/0192914 | A1 | 8/2013 | Nakamori | |

FOREIGN PATENT DOCUMENTS

| | | |
|---|---|---|
| CN | 103223845 A | 7/2013 |
| CN | 104118304 A | 10/2014 |
| CN | 107305934 A | 10/2017 |
| CN | 206878069 U | 1/2018 |
| CN | 207719295 U | 8/2018 |
| CN | 209104205 U | 7/2019 |
| JP | 2008-277058 A | 11/2008 |
| WO | WO-2013/061847 A1 | 5/2013 |

OTHER PUBLICATIONS

Contemporary Amperex Technology Co., Limited, Office Action, CN202110443118.1, dated Oct. 20, 2021, 19 pgs.
Contemporary Amperex Technology Co., Limited, Notice of Grant, CN202110443118.1, dated Mar. 15, 2022, 4 pgs.
Contemporary Amperex Technology Co., Limited, Notice of Reasons for Refusal, JP2019-106857, dated Jul. 6, 2020, 4 pgs.
Contemporary Amperex Technology Co., Limited, Decision to Grant a Patent, JP2019-106857, dated Jan. 7, 2021, 5 pgs.
Zeng, Office Action, U.S. Appl. No. 17/129,559, dated Feb. 17, 2021, 10 pgs.
Zeng, Final Office Action, U.S. Appl. No. 17/129,559, dated Apr. 15, 2021, 12 pgs.
Zeng, Notice of Allowance, U.S. Appl. No. 17/129,559, dated Jun. 25, 2021, 8 pgs.
Contemporary Amperex Technology Co., Limited, International Search Report and Written Opinion, PCT/CN2019/113965, dated Jan. 22, 2020, 9 pgs.—No Translation Available.

* cited by examiner

BATTERY BOX

CROSS-REFERENCE TO RELATED APPLICATIONS

The present application claims priority to Chinese patent application No. CN201811294488.8, filed on Nov. 1, 2018, which is incorporated herein by reference in its entirety.

FIELD OF THE PRESENT DISCLOSURE

The present disclosure relates to the field of battery technology, and particularly relates to a battery box and a vehicle.

BACKGROUND OF THE PRESENT DISCLOSURE

FIG. 1 is a perspective view of a battery box of the prior art. Referring to FIG. 1, a conventional battery box comprises an upper box body 1' and a lower box body 2'. The upper box body 1' is a non-load bearing member and mainly functions as protection, has a small thickness and can be made of a material having a low density; the lower box body 2' is a load bearing member, has a large thickness and can be made of a material having a high density (such as a metal material), and because of limitation of the forming process, the weight of the lower box body 2' is heavy.

In the conventional battery box, the upper box body 1' has a first side wall 11' and a first eave portion 12', the lower box body 2' has a second side wall 21', a second eave portion 22' and a third side wall 23' spaced apart from the second eave portion 22' in an up-down direction Z'. The second eave portion 22' of the lower box body 2' is fixedly connected with the first eave portion 12' of the upper box body 1' to achieve the fixed connection between the lower box body 2' and the upper box body 1', and the third side wall 23' of the lower box body 2' is used for mounting the battery box to an external equipment.

Because a connection portion (i.e., the second eave portion 22') of the lower box body 2' with the upper box body 1' of the battery box and a mounting portion (i.e., the third side wall 23') of the battery box are separated from each other, it results that a height of the second side wall 21' of the lower box body 2' is large and larger than a height of the first side wall 11' of the upper box body 1', therefore it increases the weight of the lower box body 2', thereby reducing the assembling efficiency of the battery box.

SUMMARY OF THE PRESENT DISCLOSURE

In view of the problem existing in the background, an object of the present disclosure is to provide a battery box and a vehicle, which reduces the overall weight of the battery box, and greatly improves the assembling efficiency and energy density of the battery box.

In order to achieve the above object, in a first aspect, the present disclosure provides a battery box, which comprises an upper box body, a lower box body, a connecting member and a fixing member. The upper box body comprises a first side wall and a first eave portion radially protruding from the first side wall, the lower box body comprises a second side wall and a second eave portion radially protruding from the second side wall. The first eave portion and the second eave portion face each other in an up-down direction, the first eave portion is provided with a first connecting hole, the second eave portion is provided with a second connecting hole and a mounting hole, and the mounting hole and the second connecting hole is spaced apart from each other. The connecting member passes through the first connecting hole and the second connecting hole to fixedly connect the upper box body and the lower box body. The fixing member passes through the mounting hole to make the lower box body mounted to an external equipment.

A material density of the lower box body is greater than a material density of the upper box body. A height of the first side wall is greater than a height of the second side wall in the up-down direction.

The height of the first side wall of the upper box body in the up-down direction is $H_1$, the height of the second side wall of the lower box body in the up-down direction is $H_2$, and $H_2 \leq 0.5 H_1$.

The second connecting hole and the mounting hole are spaced apart from each other in a circumferential direction of the second eave portion.

A central axis of the second connecting hole is close to the second side wall relative to a central axis of the mounting hole.

The first eave portion is further provided with an opening, and the opening penetrates the first eave portion and makes the mounting hole exposed on the first eave portion.

The battery box further comprises a sealing member provided between the first eave portion and the second eave portion and connecting the first eave portion and the second eave portion in sealing. The connecting member comprises an inserting portion passing through the first connecting hole and the second connecting hole, and an extending portion radially protruding from the inserting portion. At least one portion of the sealing member is located at an inner side of the extending portion in a radial direction, and a width of the at least one portion in the radial direction is an effective sealing width of the sealing member, the effective sealing width is W, and $6 \text{ cm} \leq W \leq 25 \text{ cm}$.

All portions of the sealing member are located at the inner side of the extending portion in the radial direction. Or, the sealing member comprises an effective sealing portion and a reinforce sealing portion formed on one side of the effective sealing portion close to the connecting member in the radial direction. The effective sealing portion is located at the inner side of the extending portion in the radial direction, and at least a portion of the reinforce sealing portion is pressed between the first eave portion and the second eave portion by the extending portion.

A maximum diameter of the fixing member is $A_1$, a distance between a central axis of the fixing member and the sealing member is $A_2$, and $A_2 \leq 1.5 A_1$.

The lower box body further comprises a first limiting boss protruding from an upper surface of the second eave portion in the up-down direction. The second connecting hole is penetratingly provided on the second eave portion and the first limiting boss. An initial thickness of the sealing member in the up-down direction is greater than a height of the first limiting boss.

The mounting hole is a smooth hole. The lower box body further comprise a second limiting boss protruding from an upper surface of the second eave portion in the up-down direction. The mounting hole penetrates the second eave portion and the second limiting boss. A portion of the second limiting boss protrudes from an upper surface of the first eave portion via the opening.

A distance between the upper surface of the first eave portion and the upper surface of the second eave portion is h, a height of the second limiting boss is $h_5$, and $h_5 > h$. Moreover, the first eave portion comprises a first flat-plate portion, a second flat-plate portion and a reinforce connecting portion connecting the first flat-plate portion and the second flat-plate portion, and a lower surface of the first flat-plate portion is higher than a lower surface of the second flat-plate portion. The first connecting hole is penetratingly provided on the first flat-plate portion, and the sealing member is provided between the lower surface of the first flat-plate portion and the second eave portion.

In a second aspect, the present disclosure further provides a vehicle, which comprises a body and the battery box described above.

The present disclosure has the following beneficial effects: in the battery box of the present disclosure, because the lower box body is connected to the upper box body through the second connecting hole of the second eave portion, and connected to the external equipment through the mounting hole of the second eave portion, compared with the conventional battery box involved in the background art, the lower box body is equivalent to the arrangement of eliminating the third eave portion, it simplifies the structure of the lower box body and reduces the weight of the lower box body, thereby improving the assembling efficiency and energy density of the battery box.

Figure 1:
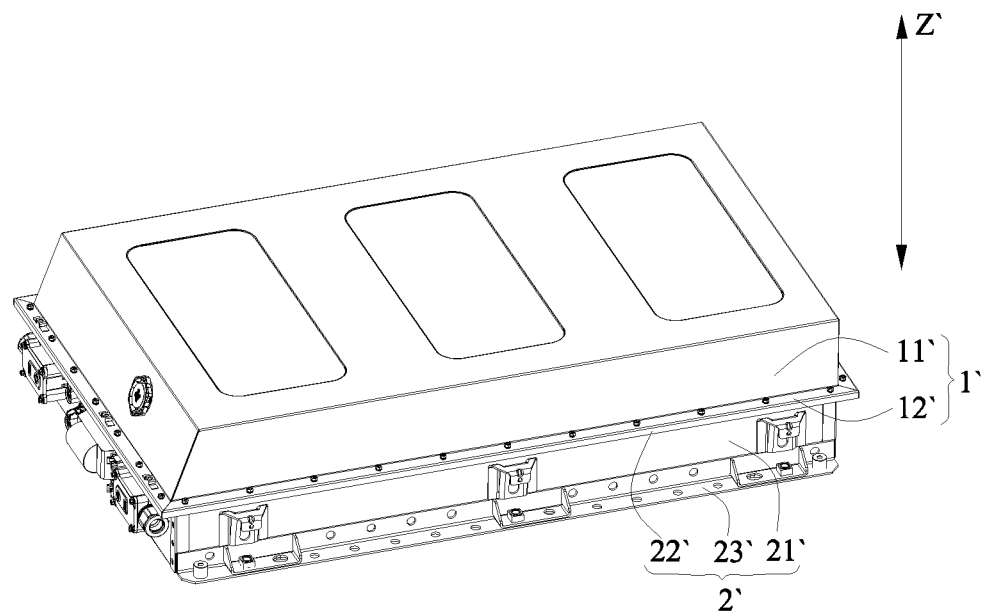
FIG. 1 is a perspective view of a battery box of the prior art.

Reference numerals are represented as follows:
1 upper box body
  11 first side wall
  12 first eave portion
    121 first connecting hole
    122 opening
    12A first flat-plate portion
    12B second flat-plate portion
    12C reinforce connecting portion
2 lower box body
  21 second side wall
  22 second eave portion
    221 second connecting hole
    222 mounting hole
  23 first limiting boss
  24 second limiting boss
3 sealing member
  31 effective sealing portion
  32 reinforce sealing portion
4 connecting member
  41 inserting portion
  42 extending portion
5 fixing member
6 nut
S external equipment
Z up-down direction

DETAILED DESCRIPTION

To make the object, technical solutions, and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second" and the like are only used for illustrative purposes and are not to be construed as expressing or implying a relative importance. The term "plurality" is two or more. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "up", "down" and the like, are described based on orientations illustrated in the figures, but are not intended to limit the embodiments of the present disclosure.

Referring to FIG. 2 to FIG. 12, a battery box of the present disclosure comprises an upper box body 1, a lower box body 2, a sealing member 3, a connecting member 4, a fixing member 5 and a nut 6.

Referring to FIG. 2 to FIG. 7, the upper box body 1 may comprise a first side wall 11 and a first eave portion 12 radially protruding from the first side wall 11, the lower box body 2 may comprise a second side wall 21 and a second eave portion 22 radially protruding from the second side wall 21.

Figure 4:
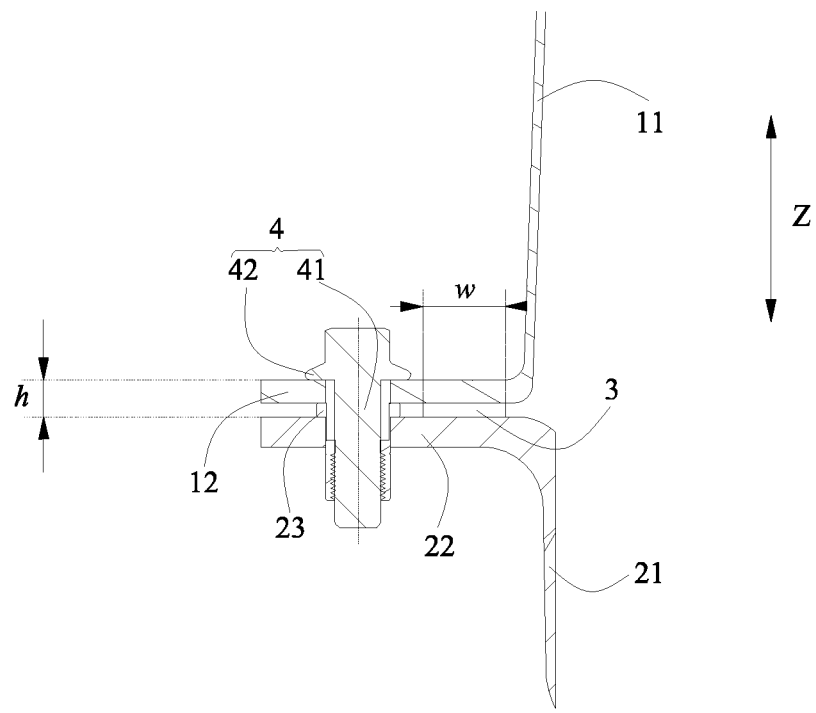
FIG. 4 is a cross-sectional schematic view of a locking connection portion (i.e., a portion is provided with a connecting member) of the battery box in an embodiment.
Figure 5:
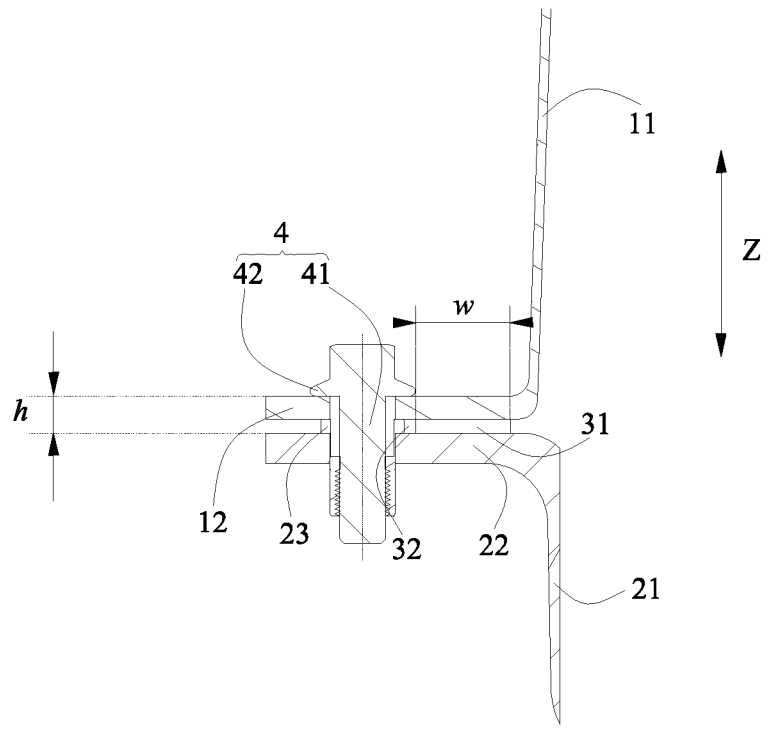
FIG. 5 is a cross-sectional schematic view of the locking connection portion of the battery box in another embodiment.
Figure 6:
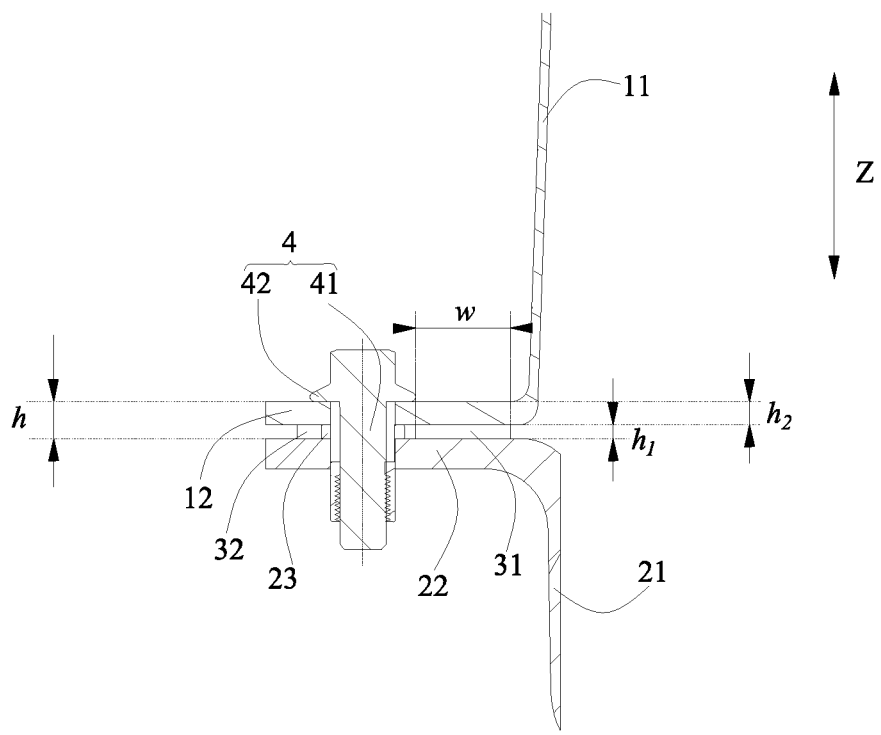
FIG. 6 is a cross-sectional schematic view of the locking connection portion of the battery box in still another embodiment.
Figure 9:
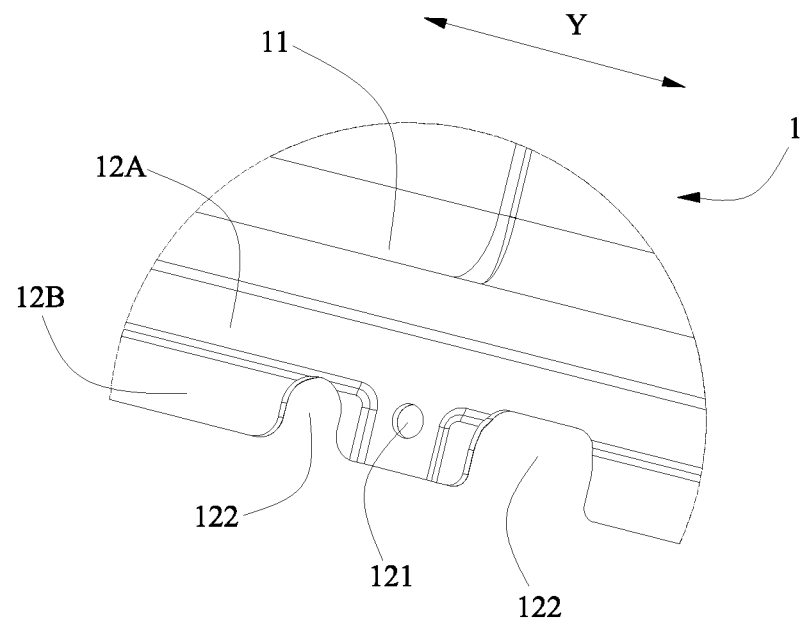
FIG. 9 is a schematic view showing the structure of an upper box body of FIG. 8.
Figure 10:
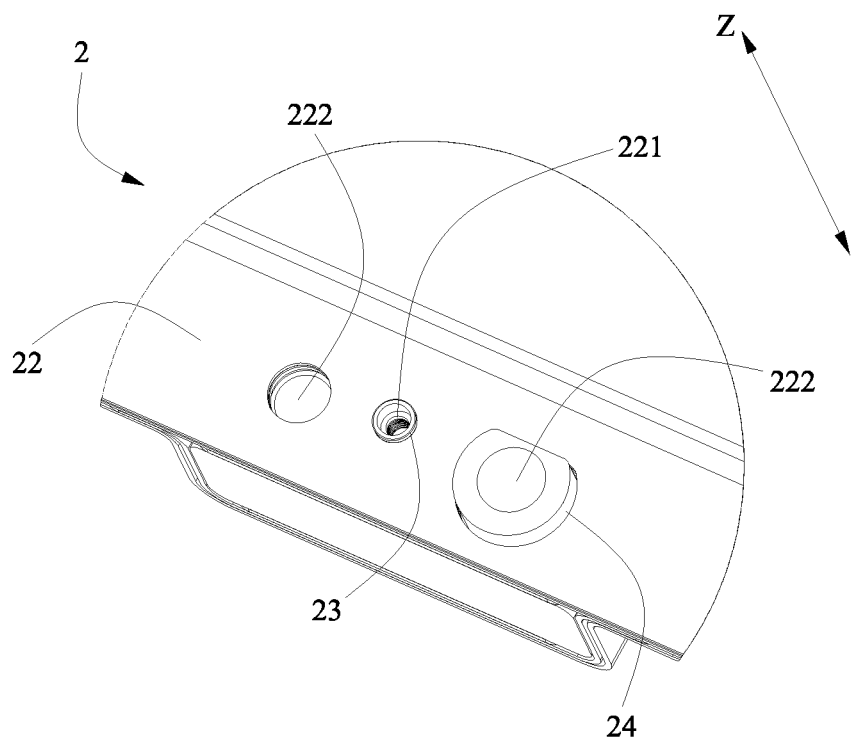
FIG. 10 is a schematic view showing the structure of a lower box body of FIG. 8.

The first eave portion 12 of the upper box body 1 and the second eave portion 22 of the lower box body 2 face each other in an up-down direction Z, referring to FIG. 9, the first eave portion 12 may be provided with a first connecting hole 121; referring to FIG. 10, the second eave portion 22 may be provided with a second connecting hole 221. The first connecting hole 121 and the second connecting hole 221 are communicated with each other in the up-down direction Z and are used for fixedly connecting the upper box body 1 and the lower box body 2 via the connecting member 4, as shown in FIG. 4 to FIG. 6.

Figure 11:
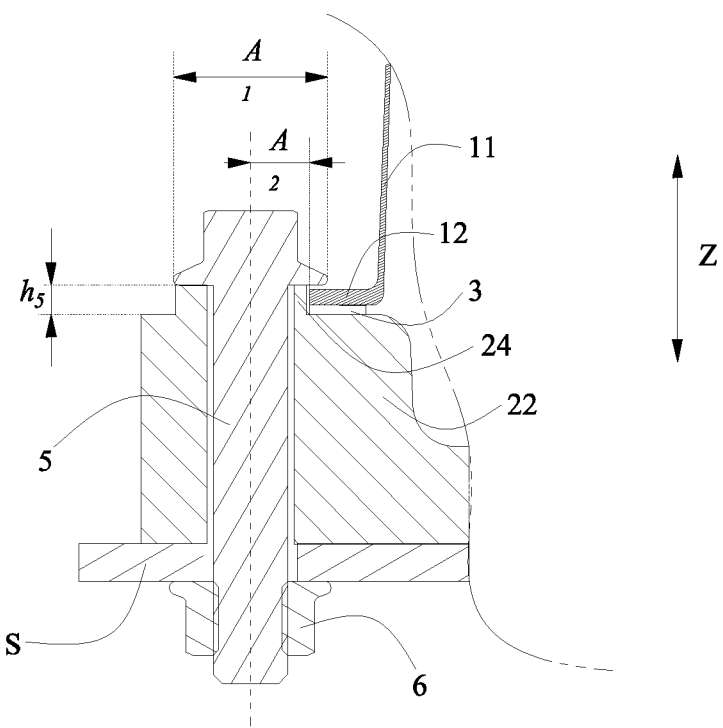
FIG. 11 is a schematic view showing the mounting of the battery box in the present disclosure and an external equipment.
Figure 12:
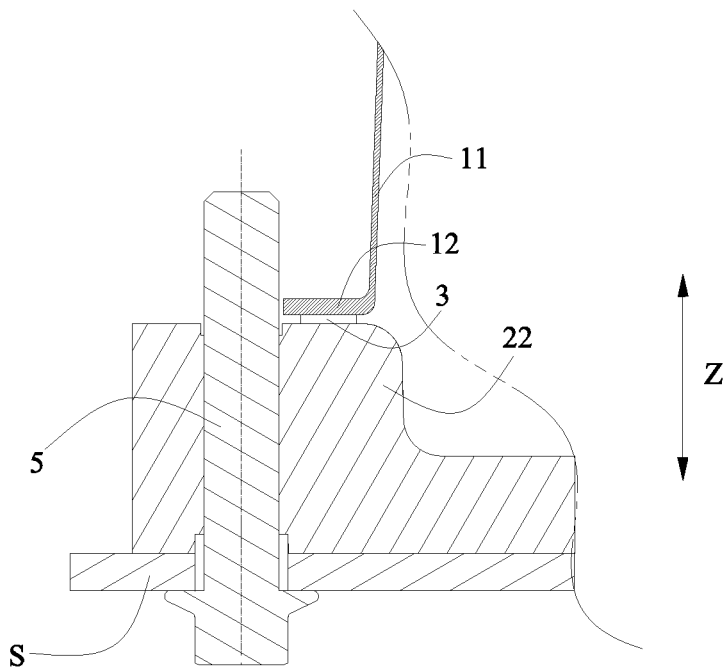
FIG. 12 is another schematic view showing the mounting of the battery box in the present disclosure and the external equipment.

Referring to FIG. 10, the second eave portion 22 of the lower box body 2 is further provided with a mounting hole 222 (may be a smooth hole or a threaded hole), the mounting hole 222 and the second connecting hole 221 are spaced apart from each other. The mounting hole 222 is used for mounting the battery box to an external equipment S via the fixing member 5, as shown in FIG. 11 and FIG. 12. Specifically, when the battery box is used in an electric vehicle, the external equipment S is a mounting beam on the body of the electric vehicle.

In the battery box of the present disclosure, because the lower box body 2 is connected to the upper box body 1 through the second connecting hole 221 of the second eave portion 22, and connected to the external equipment S through the mounting hole 222 of the second eave portion 22, compared with the conventional battery box involved in the background art, the lower box body 2 is equivalent to the arrangement of eliminating the third eave portion, it simplifies the structure of the lower box body 2 and reduces the weight of the lower box body 2, thereby improving the assembling efficiency and energy density of the battery box.

In order to avoid the first eave portion 12 of the upper box body 1 interfering with the process of mounting the lower box body 2 to the external equipment S through the mounting hole 222, the mounting hole 222 needs to be exposed on the first eave portion 12. In an embodiment, a width of the second eave portion 22 of the lower box body 2 is greater than a width of the first eave portion 12, the mounting hole 222 is positioned at an edge portion of the second eave portion 22 and makes the mounting hole 222 exposed on the first eave portion 12. In another embodiment, referring to FIG. 8 and FIG. 9, the first eave portion 12 is provided with an opening 122, the opening 122 penetrates the first eave portion 12 and makes the mounting hole 222 exposed on the first eave portion 12, and the width of the second eave portion 22 of the lower box body 2 may be not greater than the width of the first eave portion 12, thereby helping to reduce the weight of the lower box body 2.

Figure 2:
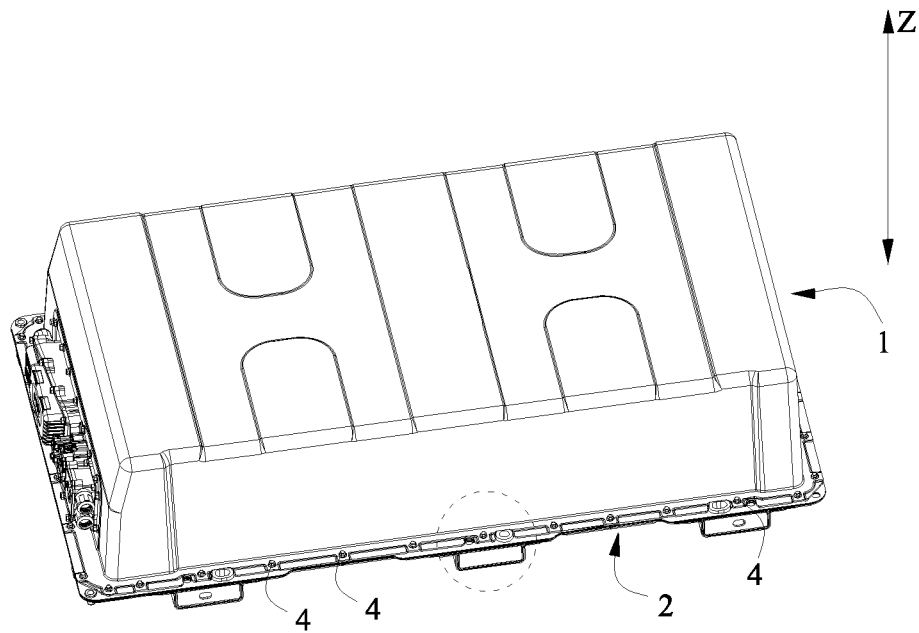
FIG. 2 is a perspective view of the battery box of the present disclosure.
Figure 3:
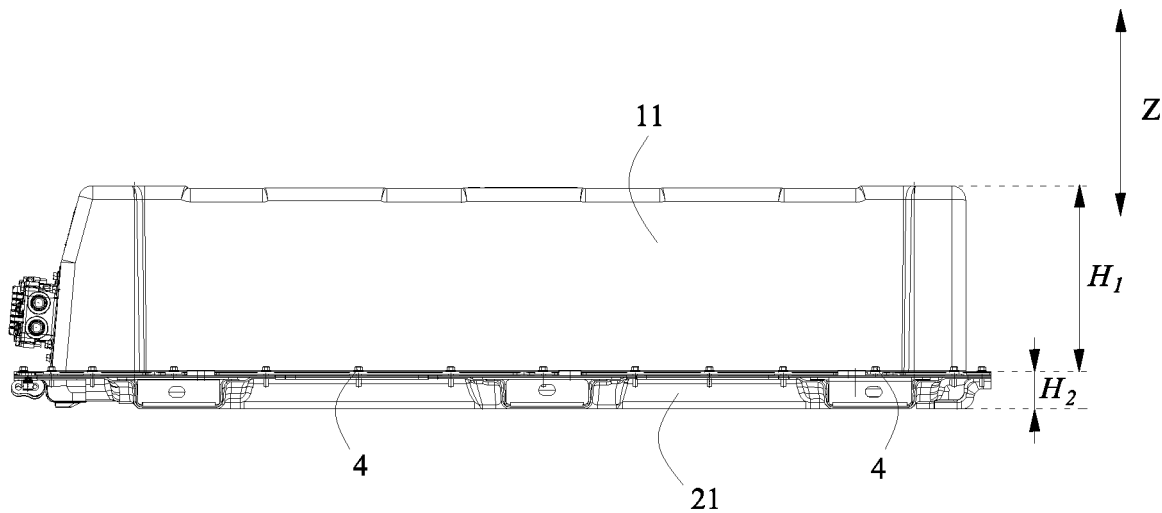
FIG. 3 is a front view of FIG. 2.

A material density of the lower box body 2 is greater than a material density of the upper box body 1. Referring to FIG. 2 and FIG. 3, a height of the first side wall 11 of the upper box body 1 is greater than a height of the second side wall 21 of the lower box body 2 in the up-down direction Z. Compared with the conventional battery box involved in the background art, the structure of the battery box of the present disclosure greatly reduces the height of the second side wall 21 of the lower box body 2.

Because the upper box body 1 is a non-load bearing member, it has a small thickness and can be made of a material having a low density (such as plastic, SMC composite material, glass fiber reinforced resin, and carbon fiber reinforced resin). The lower box body 2 is a load bearing member, it has a large thickness and can be made of a material having a high density (such as a metal material), so reducing the height of the second side wall 21 of the lower box body 2 can significantly reduce the overall weight of the battery box, thereby greatly improving the assembling efficiency of the battery box.

The height of the first side wall 11 of the upper box body 1 in the up-down direction Z is $H_1$, the height of the second side wall 21 of the lower box body 2 in the up-down direction Z is $H_2$, and $H_2 \leq 0.5 H_1$, that is the height of the lower box body 2 is smaller than or equal to 1/3 of the overall height of the battery box, and the lower box body 2 is lower than the center of gravity of the battery box (about at 1/2 of the overall height of the battery box). In the case where the overall height and weight of the battery box are constant, if $H_2 > 0.5 H_1$, the distance between the second eave portion 22 and the bottom of the lower box body 2 will be increased (i.e., the distance between the mounting hole 222 and the bottom of the lower box body 2 is increased), after the battery box is connected with the external equipment through the mounting hole 222, a gap is easily generated between the battery box and the external equipment, and when the battery box is subjected to vibration or impact during use, the tearing damage of the mounting hole 222 is easily caused, thereby resulting in that the mounting of the battery box is not stable.

In order not to increase the width of the second eave portion 22, the second connecting hole 221 and the mounting hole 222 are spaced apart from each other in a circumferential direction of the second eave portion 22, as shown in FIG. 10. This is because, in the case where the width of the second eave portion 22 is constant, if the second connecting hole 221 and the mounting hole 222 are spaced apart from each other in the radial direction of the second eave portion 22, the mounting hole 222 will be positioned at the edge of the second eave portion 22, therefore the mounting hole 222 may be torn due to a large pressure when the fixing member 5 passes through the mounting hole 222 and mounts the battery box; and if the width of the second eave portion 22 is increased so that the second connecting hole 221 and the mounting hole 222 are provided in the radial direction of the second eave portion 22 at the same time, it is not beneficial to reduce the weight of the lower box body 2.

Further referring to FIG. 10, a central axis of the second connecting hole 221 (parallel to the up-down direction Z) is close to the second side wall 21 relative to a central axis of the mounting hole 222. In other words, while the second connecting hole 221 and the mounting hole 222 are spaced apart from each other in the circumferential direction of the second eave portion 22, there is an offset therebetween in the radial direction of the second eave portion 22, therefore the fixing member 5 does not interfere with the sealing of the sealing member 3 when the fixing member 5 passes through the mounting hole 222 and mounts the battery box.

Referring to FIG. 4 to FIG. 7, the sealing member 3 is provided between the first eave portion 12 of the upper box body 1 and the second eave portion 22 of the lower box body 2 and connects the first eave portion 12 and the second eave portion 22 in sealing. The sealing member 3 may be a sealing pad, a cured sealant or a composite of the sealing pad and the cured sealant.

In order to avoid the failure of the sealing member 3 and increase the service life of the sealing member 3, referring to FIG. 4 to FIG. 6, the lower box body 2 is further provided with a first limiting boss 23, and the first limiting boss 23 protrudes from the upper surface of the second eave portion 22 in the up-down direction Z. The second connecting hole 221 is penetratingly provided on the second eave portion 22 and the first limiting boss 23. An initial thickness of the sealing member 3 (i.e., the thickness before the sealing member 3 is compressed) in the up-down direction Z is greater than a height of the first limiting boss 23.

When the connecting member 4 connects and fixes the upper box body 1 and the lower box body 2 through the second connecting hole 221, because the initial thickness of the sealing member 3 is greater than the height of the first limiting boss 23, the first eave portion 12 of the upper box body 1 compresses the sealing member 3, and the compressed sealing member 3 can ensure a reliable sealing between the upper box body 1 and the lower box body 2. Meanwhile, when the first eave portion 12 of the upper box body 1 is pressed down and contacts the first limiting boss 23 of the lower box body 2, the first limiting boss 23 can limit the further pressing of the first eave portion 12 of the upper box body 1, therefore it avoids the damage of the sealing member 3 due to the too large contact pressure between the upper box body 1 and the sealing member 3, thereby preventing the failure of the sealing member 3. In addition, the magnitude of the contact pressure between upper box body 1 and the sealing member 3 can be conveniently controlled by adjusting the initial thickness of the sealing member 3 before the sealing member 3 is compressed and the height of the first limiting boss 23.

Referring to FIG. 4 to FIG. 6, the connecting member 4 is a connecting bolt, and the connecting member 4 cooperates with the nut 6 to connect and fix the upper box body 1 and the lower box body 2. The connecting member 4 may comprise: an inserting portion 41 passing through the first connecting hole 121 and the second connecting hole 221; and an extending portion 42 radially protruding from the inserting portion 41. At least one portion of the sealing member 3 is located at an inner side of the extending portion 42 in the radial direction, and the width of the at least one portion in the radial direction is the effective sealing width of the sealing member 3, the effective sealing width is W, and 6 cm≤W≤25 cm.

It should be noted that, the inner side of the extending portion 42 refers to the side of extending portion 42 close to the upper box body 1. The effective sealing width refers to the minimum width of the sealing member 3 which is not interfered by other components, and the effective sealing width of the sealing member 3 ensures the sealing reliability between the upper box body 1 and the lower box body 2.

In an embodiment, referring to FIG. 4, all portions of the sealing member 3 are located at the inner side of the extending portion 42 in the radial direction. All portions of the sealing member 3 are not interfered by the connecting member 4, and all portions of the sealing member 3 exert the function of sealing. In order to prevent the sealing member 3 from deviating under pressing, the sealing member 3 can be bonded to the first eave portion 12 or the second eave portion 22 in advance.

In another embodiment, referring to FIG. 5 and FIG. 6, the sealing member 3 may comprise: an effective sealing portion 31; and a reinforce sealing portion 32 formed on one side of the effective sealing portion 31 close to the connecting member 4 in the radial direction. The effective sealing portion 31 is located at the inner side of the extending portion 42 in the radial direction (i.e., the width of the effective sealing portion 31 is the effective sealing width W, and the effective sealing portion 31 is not interfered by the connecting member 4 and serves as an effective sealing effect), and at least a portion of the reinforce sealing portion 32 is pressed between the first eave portion 12 and the second eave portion 22 by the extending portion 42 of the connecting member 4.

Specifically, when the width of the reinforce sealing portion 32 of the sealing member 3 in the radial direction is small, the entirely reinforce sealing portion 32 can be located between the extending portion 42 and the inserting portion 41 in the radial direction, as shown in FIG. 5. When the width of the reinforce sealing portion 32 of the sealing member 3 in the radial direction is large, the reinforce sealing portion 32 can be provided with a third connecting hole corresponding to the first connecting hole 121 and the second connecting hole 221, and the inserting portion 41 of the connecting member 4 passes through the first connecting hole 121 of the first eave portion 12, the third connecting hole of the reinforce sealing portion 32 and the second connecting hole 221 of the second eave portion 22, so as to make the sealing member 3 fixed between the first eave portion 12 and the second eave portion 22.

In the design process of the battery box, in order to avoid that the connecting force of the connecting member 4 does not act on the sealing member 3 or only a part of the connecting force act on the sealing member 3 due to the too large distance between the second connecting hole 221 and the second side wall 21 so that the sealing member 3 cannot serve as an effective sealing effect, and the position of the second connecting hole 221 needs to be determined according to the effective sealing portion 31 of the sealing member 3, that is, the second connecting hole 221 needs to be provided close to the effective sealing portion 31.

Referring to FIG. 11 and FIG. 12, the fixing member 5 may be a connecting bolt. Based on the different structures of the mounting hole 222 on the lower box body 2, the manners of the lower box body 2 mounted to the external equipment S through the mounting hole 222 are different, and are specifically described below.

Referring to FIG. 11, when the mounting hole 222 is the smooth hole (i.e., the inner surface of the mounting hole 222 is not provided with a thread), the fixing member 5 passes through the mounting hole 222 of the lower box body 2 and a through hole of the external equipment S, and cooperates with the nut 6 to achieve the fixed mounting between the lower box body 2 and the external equipment S. The nut 6 can be placed on one side of the external equipment S, or can be sunk into the through hole of the external equipment S, and at this time the fixing member 5 sequentially passes through the mounting hole 222 of the lower box body 2 and the through hole of the external equipment S to cooperate with the nut 6. Of course, the nut 6 can also be placed on one side of the lower box body 2, at this time the fixing member 5 sequentially passes through the through hole of the external equipment S and the mounting hole 222 of the lower box body 2 to cooperate with the nut 6.

Referring to FIG. 12, when the mounting hole 222 is the threaded hole, the fixing member 5 sequentially passes through the through hole of the external equipment S and the mounting hole 222 of the lower box body 2, and engages with the mounting hole 222 in thread to make the lower box body 2 fixedly mounted to the external equipment S.

Referring to FIG. 11 and FIG. 12, a maximum diameter of the fixing member 5 is $A_1$, a distance between a central axis of the fixing member 5 and the reinforce sealing portion 32 of the sealing member 3 is 4. During the connecting process of the fixing member 5 and the external equipment S, because the mounting hole 222 and the circumambience of the mounting hole 222 are subjected to a large pressure, and the reinforce sealing portion 32 will be deformed due to the large pressure, in order to prevent the failure of the sealing member 3 under the influence of the fixing member 5, $A_1$ and $A_2$ needs to meet the following relationship: $A_2 \leq 1.5 A_1$.

When the fixing member 5 is mounted to the external equipment S through the mounting hole 222, especially when the mounting hole 222 is the smooth hole, because the locking force of the fixing member 5 is large, the portion of the sealing member 3 contacting the fixing member 5 may generate a certain deformation, and the sealing member 3 is sensitive to the deformation, and the too large deformation can cause the failure of the sealing member 3. Therefore, in order to further avoid the failure of the sealing member 3 and improve the service life of the sealing member 3, referring to FIG. 8, FIG. 10 and FIG. 12, the lower box body 2 may further comprise: a second limiting boss 24 protruding from the upper surface of the second eave portion 22 in the up-down direction Z. The mounting hole 222 penetrates the second eave portion 22 and the second limiting boss 24. A portion of the second limiting boss 24 protrudes from the upper surface of the first eave portion 12 via the opening 122. During the connecting process of the fixing member 5 and the external equipment S, based on the arrangement of the second limiting boss 24, it effectively avoids the fixing member 5 directly squeezing the second eave portion 22 of the lower box body 2, in turn prevents the fixing member 5 from pressing the sealing member 3.

Referring to FIG. 4 to FIG. 6, after the upper box body 1 is fixedly connected with the lower box body 2 via the connecting member 4, in the locking connection portion of the upper box body 1 and the lower box body 2, a height of the first limiting boss 23 is $h_1$, a thickness of the first eave portion 12 is $h_2$, a distance between the upper surface of the first eave portion 12 (i.e., the upper surface of the first flat-plate portion 12A described later) and the upper surface of the second eave portion 22 is h, and $h=h_1+h_2$. Referring to FIG. 11, a height of the second limiting boss 24 is $h_5$, and in order to prevent the fixing member 5 from squeezing the sealing member 3, $h_5>h$.

Figure 7:
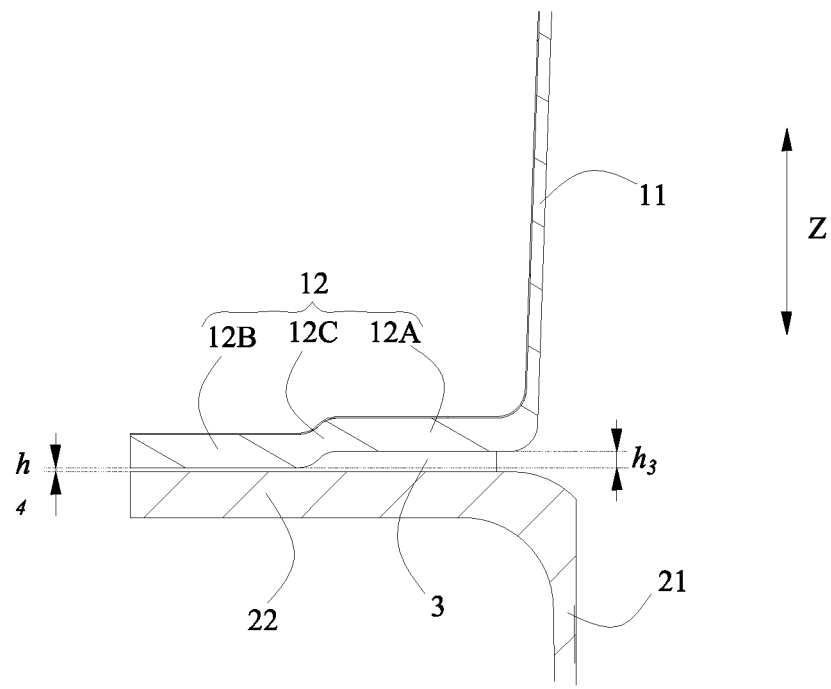
FIG. 7 is a cross-sectional schematic view of a non-locking connection portion (i.e., a portion is not provided with the connecting member) of the battery box battery box.
Figure 8:
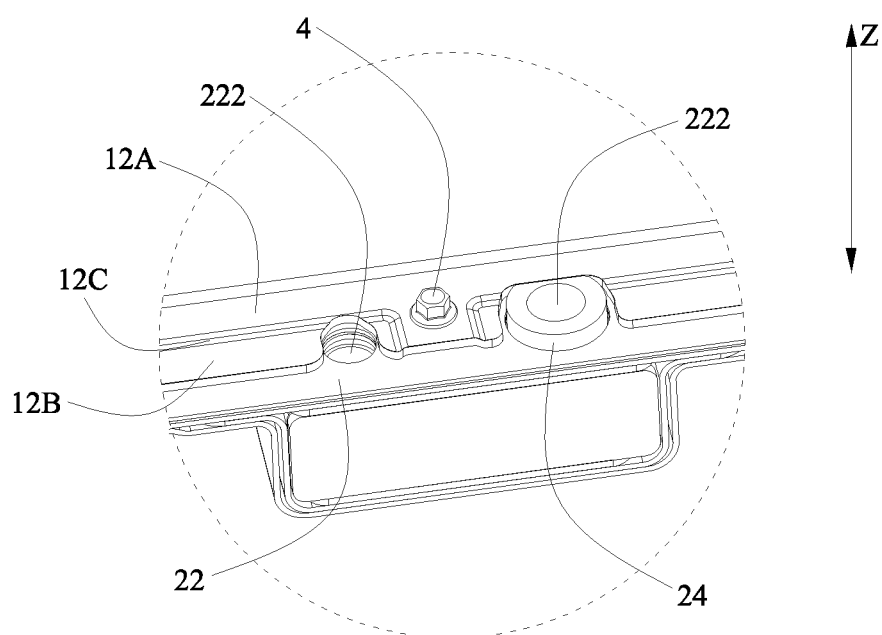
FIG. 8 is an enlarged view of a part of FIG. 2 indicated by a circle.

Referring to FIG. 7 to FIG. 9, the first eave portion 12 may comprise a first flat-plate portion 12A, a second flat-plate portion 12B and a reinforce connecting portion 12C connecting the first flat-plate portion 12A and the second flat-plate portion 12B. A lower surface of the first flat-plate portion 12A is higher than a lower surface of the second flat-plate portion 12B, so that an accommodation space forms between the first eave portion 12 and the second eave portion 22 and is used for accommodating the sealing member 3. An upper surface of the first flat-plate portion 12A may be higher than an upper surface of the second flat-plate portion 12B, therefore it reduces the weight of the first eave portion 12 and improves the deformability of the first eave portion 12, is beneficial for the sealing connection between the first eave portion 12 and the second eave portion 22. Here, the reinforce connecting portion 12C, the first flat-plate portion 12A, and the second flat-plate portion 12B are integrally formed into a structure with a rib, which improves the strength of the first eave portion 12.

Referring to FIG. 8 and FIG. 9, the first connecting hole 121 is penetratingly provided on the first flat-plate portion 12A. The sealing member 3 is provided between the lower surface of the first flat-plate portion 12A and the second eave portion 22.

Referring to FIG. 7, after the upper box body 1 is fixedly connected with the lower box body 2 via the connecting member 4, in the non-locking connection portion of the upper box body 1 and the lower box body 2, a distance between the lower surface of the first flat-plate portion 12A and the lower surface of the second flat-plate portion 12B is $h_3$, a gap between the second flat-plate portion 12B and the second eave portion 22 of the lower box body 2 is $h_4$, and $h_4=h_1-h_3$. In order to prevent the water outside the battery box from directly flushing the sealing member 3 through the gap, it should ensure that $h_4$ is as small as possible by reducing the manufacturing tolerance between the upper box body 1 and the lower box body 2 in the manufacturing process of the upper box body 1 and the lower box body 2, thereby ensuring the sealing property of the battery box.

What is claimed is:

1. A battery box, comprising an upper box body, a lower box body, a connecting member, a sealing member, and a fixing member;

the upper box body comprising a first side wall and a first eave portion radially protruding from the first side wall, wherein the first eave portion and the first side wall are integrally formed;

the lower box body comprising a second side wall and a second eave portion radially protruding from the second side wall, and a first limiting boss protruding from an upper surface of the second eave portion in an up-down direction, wherein the second eave portion and the second side wall are integrally formed, and a height of the first side wall is greater than a height of the second side wall;

the first eave portion and the second eave portion facing each other in the up-down direction, a width of a surface of the first eave portion that contacts the second eave portion is smaller than a width of a surface of the second eave portion that contacts the first eave portion, the first eave portion being provided with a first connecting hole, the second eave portion being provided with a second connecting hole and a mounting hole, the mounting hole and the second connecting hole being spaced apart from each other, and the second connecting hole being penetratingly provided on the second eave portion and the first limiting boss;

the connecting member passing through the first connecting hole and the second connecting hole to fixedly connect the upper box body and the lower box body;

the sealing member being provided between the first eave portion and the second eave portion and connecting the first eave portion and the second eave portion in sealing, and an initial thickness of the sealing member in the up-down direction being greater than a height of the first limiting boss; and the fixing member passing through the mounting hole to make the lower box body mounted to an external equipment.

2. The battery box according to claim 1, wherein
a material density of the lower box body is greater than a material density of the upper box body; and
a height of the first side wall is greater than a height of the second side wall in the up-down direction.

3. The battery box according to claim 2, wherein the height of the first side wall of the upper box body in the up-down direction is $H_1$, the height of the second side wall of the lower box body in the up-down direction is $H_2$, and $H_2 \leq 0.5 H_1$.

4. The battery box according to claim 1, wherein the second connecting hole and the mounting hole are spaced apart from each other in a circumferential direction of the second eave portion.

5. The battery box according to claim 4, wherein a central axis of the second connecting hole is close to the second side wall relative to a central axis of the mounting hole.

6. The battery box according to claim 1, wherein the first eave portion is further provided with an opening, and the opening penetrates the first eave portion and makes the mounting hole exposed on the first eave portion.

7. The battery box according to claim 1, wherein
the connecting member comprises an inserting portion passing through the first connecting hole and the second connecting hole, and an extending portion radially protruding from the inserting portion; and
at least one portion of the sealing member is located at an inner side of the extending portion in a radial direction, and a width of the at least one portion in the radial direction is an effective sealing width of the sealing member, the effective sealing width is W, and 6 cm≤W≤25 cm.

8. The battery box according to claim 7, wherein
all portions of the sealing member are located at the inner side of the extending portion in the radial direction; or
the sealing member comprises an effective sealing portion and a reinforce sealing portion formed on one side of the effective sealing portion close to the connecting member in the radial direction; and
the effective sealing portion is located at the inner side of the extending portion in the radial direction, and at least a portion of the reinforce sealing portion is pressed between the first eave portion and the second eave portion by the extending portion.

9. The battery box according to claim 7, wherein a maximum diameter of the fixing member is $A_1$, a distance between a central axis of the fixing member and the sealing member is $A_2$, and $A_2 \leq 1.5A_1$.

10. The battery box according to claim 6, wherein
the mounting hole is a smooth hole;
the lower box body further comprise a second limiting boss protruding from the upper surface of the second eave portion in the up-down direction;
the mounting hole penetrates the second eave portion and the second limiting boss; and
a portion of the second limiting boss protrudes from an upper surface of the first eave portion via the opening.

11. The battery box according to claim 10, wherein a distance between the upper surface of the first eave portion and the upper surface of the second eave portion is h, a height of the second limiting boss is $h_5$, and $h_5 > h$.

12. The battery box according to claim 7, wherein
the first eave portion comprises a first flat-plate portion, a second flat-plate portion, and a reinforce connecting portion connecting the first flat-plate portion and the second flat-plate portion;
a lower surface of the first flat-plate portion is higher than a lower surface of the second flat-plate portion;
the first connecting hole is penetratingly provided on the first flat-plate portion; and
the sealing member is provided between the lower surface of the first flat-plate portion and the second eave portion.

13. A vehicle, comprising a body and a battery box, wherein
the battery box comprises an upper box body, a lower box body, a connecting member, a sealing member, and a fixing member;
the upper box body comprising a first side wall and a first eave portion radially protruding from the first side wall, wherein the first eave portion and the first side wall are integrally formed;
the lower box body comprising a second side wall and a second eave portion radially protruding from the second side wall, and a first limiting boss protruding from an upper surface of the second eave portion in an up-down direction, wherein the second eave portion and the second side wall are integrally formed, and a height of the first side wall is greater than a height of the second side wall;
the first eave portion and the second eave portion facing each other in the up-down direction, a width of a surface of the first eave portion that contacts the second eave portion is smaller than a width of a surface of the second eave portion that contacts the first eave portion, the first eave portion being provided with a first connecting hole, the second eave portion being provided with a second connecting hole and a mounting hole, the mounting hole and the second connecting hole being spaced apart from each other, and the second connecting hole being penetratingly provided on the second eave portion and the first limiting boss;
the connecting member passes through the first connecting hole and the second connecting hole to fixedly connect the upper box body and the lower box body;
the sealing member being provided between the first eave portion and the second eave portion and connecting the first eave portion and the second eave portion in sealing, and an initial thickness of the sealing member in the up-down direction being greater than a height of the first limiting boss; and
the fixing member passes through the mounting hole to make the lower box body mounted to the body.

14. The vehicle according to claim 13, wherein
a material density of the lower box body is greater than a material density of the upper box body; and
a height of the first side wall is greater than a height of the second side wall in the up-down direction.

15. The vehicle according to claim 13, wherein the second connecting hole and the mounting hole are spaced apart from each other in a circumferential direction of the second eave portion.

16. The vehicle according to claim 15, wherein a central axis of the second connecting hole is close to the second side wall relative to a central axis of the mounting hole.

17. The vehicle according to claim 13, wherein
the connecting member comprises an inserting portion passing through the first connecting hole and the second connecting hole, and an extending portion radially protruding from the inserting portion; and
at least one portion of the sealing member is located at an inner side of the extending portion in a radial direction, and a width of the at least one portion in the radial direction is an effective sealing width of the sealing member, the effective sealing width is W, and 6 cm≤W≤25 cm.

18. The vehicle according to claim 17, wherein
all portions of the sealing member are located at the inner side of the extending portion in the radial direction; or
the sealing member comprises an effective sealing portion and a reinforce sealing portion formed on one side of the effective sealing portion close to the connecting member in the radial direction; and
the effective sealing portion is located at the inner side of the extending portion in the radial direction, and at least a portion of the reinforce sealing portion is pressed between the first eave portion and the second eave portion by the extending portion.

19. The vehicle according to claim 17, wherein a maximum diameter of the fixing member is $A_1$, a distance between a central axis of the fixing member and the sealing member is $A_2$, and $A_2 \leq 1.5A_1$.

* * * * *